(12) United States Patent
Parsons et al.

(10) Patent No.: US 12,054,245 B2
(45) Date of Patent: Aug. 6, 2024

(54) OPTIMIZING USAGE OF SUPPLEMENTAL ENGINE POWER

(71) Applicant: Textron Innovations Inc., Providence, RI (US)

(72) Inventors: Thomas Dewey Parsons, Fort Worth, TX (US); Charles Eric Covington, Colleyville, TX (US); Kent E. Donaldson, Fort Worth, TX (US); Andrew Thomas Carter, Richland Hills, TX (US)

(73) Assignee: Textron Innovations Inc., Providence, RI (US)

( * ) Notice: Subject to any disclaimer, the term of this patent is extended or adjusted under 35 U.S.C. 154(b) by 109 days.

(21) Appl. No.: 17/867,231

(22) Filed: Jul. 18, 2022

(65) Prior Publication Data

US 2024/0017823 A1   Jan. 18, 2024

(51) Int. Cl.
*B64C 27/12* (2006.01)
*B64D 31/06* (2006.01)

(52) U.S. Cl.
CPC .............. *B64C 27/12* (2013.01); *B64D 31/06* (2013.01)

(58) Field of Classification Search
CPC ......... B64C 27/12; B64C 27/06; B64D 31/06; B64D 35/08; F16D 1/10; F16D 41/04;
(Continued)

(56) References Cited

U.S. PATENT DOCUMENTS

| 204,085 | A | * | 5/1878 | Rabbeth | D01H 7/041 |
| | | | | | 384/228 |
| 4,338,525 | A | * | 7/1982 | Kilgore | H02P 1/52 |
| | | | | | 318/148 |

(Continued)

FOREIGN PATENT DOCUMENTS

| EP | 3693271 A1 | 8/2020 |
| WO | WO-2016049030 A1 | 3/2016 |

OTHER PUBLICATIONS

Covington, Charles Eric, et al.; "Supplemental Engine Power Control"; U.S. Appl. No. 17/342,963, filed Jun. 9, 2021; 43 pages.
(Continued)

*Primary Examiner* — Medhat Badawi
(74) *Attorney, Agent, or Firm* — Bradley Arant Boult Cummings LLP (57) ABSTRACT

In an embodiment, an aircraft includes a drive system, a main engine coupled to the drive system to provide first power, and a supplemental engine coupled to the drive system to provide second power additive to the first power. The aircraft also includes a control system to control the main engine and the supplemental engine to optimize usage of the supplemental engine. The control system is operable to maintain the supplemental engine in a reduced power state at least until a determination is made that supplemental power is needed to satisfy a total power demand of the drive system. The control system is also operable to determine that supplemental power is needed to satisfy the total power demand of the drive system. The control system is further operable to increase a power level of the supplemental engine in response to the determination that supplemental power is needed.

18 Claims, 9 Drawing Sheets

(58) Field of Classification Search
CPC ........ F16D 41/07; F16D 25/083; F16D 11/14; F16D 41/069; F16D 2001/103; F16D 2011/004; F16D 2121/04; F16D 47/04
See application file for complete search history.

(56) References Cited

U.S. PATENT DOCUMENTS

| | | | | |
|---|---|---|---|---|
| 5,915,917 A * | 6/1999 | Eveker | ................... | F04D 27/02 415/17 |
| 5,923,515 A * | 7/1999 | Eubanks | ............. | H01H 85/306 361/57 |
| 6,010,303 A * | 1/2000 | Feulner | .................. | F04D 27/02 415/49 |
| 6,059,522 A * | 5/2000 | Gertz | ....................... | F02C 9/28 415/27 |
| 6,198,238 B1 * | 3/2001 | Edelson | .................. | H02K 3/28 363/175 |
| 6,729,139 B2 | 5/2004 | Desai et al. | | |
| 6,986,641 B1 | 1/2006 | Desai et al. | | |
| 7,540,450 B2 * | 6/2009 | Brand | .................... | B64D 35/04 244/54 |
| 7,827,803 B1 * | 11/2010 | Wadia | .................... | F02C 7/057 60/39.27 |
| 7,939,962 B2 * | 5/2011 | Foch | ........................ | H02J 4/00 307/19 |
| 8,080,950 B2 * | 12/2011 | Beck | ....................... | H02P 27/06 318/158 |
| 8,274,803 B2 * | 9/2012 | Swamy | ................. | H02M 5/458 318/140 |
| 8,324,746 B2 * | 12/2012 | Bradbrook | ............... | F02C 3/10 290/1 A |
| 8,355,855 B2 * | 1/2013 | Minto | ...................... | F02C 9/48 60/330 |
| 8,562,284 B2 * | 10/2013 | Bradbrook | ............... | F02K 3/04 416/129 |
| 9,156,560 B2 * | 10/2015 | Burns | .................... | B64D 27/10 |
| 9,193,453 B2 * | 11/2015 | Vallart | .................... | B64C 27/57 |
| 9,270,219 B2 * | 2/2016 | Lando | ..................... | H02P 9/48 |
| 9,428,267 B2 * | 8/2016 | DeVita | .................... | F02C 7/262 |
| 9,821,908 B2 | 11/2017 | Schaeffer et al. | | |
| 10,260,471 B2 * | 4/2019 | Huang | ..................... | H02J 4/00 |
| 10,392,119 B2 * | 8/2019 | Niergarth | ............... | B64C 21/01 |
| 10,435,165 B2 * | 10/2019 | Swann | ................... | F02K 5/00 |
| 10,436,059 B2 * | 10/2019 | Liu | ......................... | F04D 27/001 |
| 10,442,547 B2 * | 10/2019 | Miller | ....................... | B60L 3/12 |
| 10,487,733 B2 * | 11/2019 | Morgan | ................. | F01D 15/10 |
| 10,696,416 B2 * | 6/2020 | Gansler | ................. | F02C 6/14 |
| 10,711,693 B2 * | 7/2020 | Miller | ....................... | F02C 7/32 |
| 10,730,633 B2 * | 8/2020 | Anghel | ................. | B64D 31/00 |
| 10,738,706 B2 * | 8/2020 | Gansler | ................. | F02K 5/00 |
| 10,788,088 B2 | 9/2020 | Olson et al. | | |
| 10,793,284 B2 * | 10/2020 | Prater | ..................... | F16D 25/14 |
| 10,953,995 B2 * | 3/2021 | Gansler | ................. | B64D 27/02 |
| 11,130,456 B2 * | 9/2021 | Klemen | ................. | H02K 5/203 |
| 11,196,585 B1 * | 12/2021 | Auerbach | ......... | H04L 12/40013 |
| 11,447,015 B1 * | 9/2022 | Wiegman | ................. | B60L 58/21 |
| 11,473,496 B2 * | 10/2022 | Romero | ................. | F02C 3/113 |
| 11,682,535 B2 * | 6/2023 | Maragni | ................ | H01H 23/08 200/402 |
| 11,688,568 B2 * | 6/2023 | Maragni | ................ | H01H 23/16 200/6 A |
| 2003/0094001 A1 * | 5/2003 | Desai | .................... | B64C 27/001 60/791 |
| 2005/0225303 A1 * | 10/2005 | Xu | .......................... | F02C 7/268 322/59 |
| 2010/0013300 A1 * | 1/2010 | Lando | .................... | H02P 27/04 318/808 |
| 2010/0138089 A1 * | 6/2010 | James | .................... | B60K 6/46 477/3 |
| 2010/0148719 A1 * | 6/2010 | Fisher | .................... | H02P 27/04 318/806 |
| 2011/0080040 A1 * | 4/2011 | Kumar | .................... | B60L 1/02 290/16 |
| 2012/0227389 A1 * | 9/2012 | Hinderks | ............... | F02B 75/002 60/317 |
| 2013/0086919 A1 * | 4/2013 | Dooley | ................... | B64C 27/12 60/778 |
| 2013/0094963 A1 * | 4/2013 | Rolt | ........................ | B64D 27/02 416/31 |
| 2013/0169036 A1 * | 7/2013 | Todd | ......................... | H02J 4/00 307/9.1 |
| 2013/0247579 A1 * | 9/2013 | Morawski | ............... | F02C 7/262 60/778 |
| 2014/0084677 A1 * | 3/2014 | Haillot | ..................... | F02C 7/36 307/9.1 |
| 2014/0252158 A1 * | 9/2014 | Schaeffer | ............... | B64D 31/06 244/17.13 |
| 2014/0290208 A1 * | 10/2014 | Rechain | .................. | B64C 27/04 60/39.23 |
| 2014/0333127 A1 * | 11/2014 | Edwards | .................. | H02J 4/00 307/9.1 |
| 2014/0363288 A1 * | 12/2014 | Schaeffer | ............... | B64C 27/57 416/1 |
| 2015/0151844 A1 * | 6/2015 | Anton | .................... | B64C 31/024 903/903 |
| 2015/0274306 A1 * | 10/2015 | Sheridan | .................. | F02C 7/36 60/726 |
| 2015/0283908 A1 * | 10/2015 | Himmelmann | ........ | B64C 25/405 290/9 |
| 2015/0333527 A1 * | 11/2015 | Rideau | ..................... | H02J 7/02 307/31 |
| 2015/0345403 A1 * | 12/2015 | Cai | ............................ | F02C 9/00 701/100 |
| 2015/0367950 A1 * | 12/2015 | Rajashekara | ............ | F01D 7/02 903/930 |
| 2016/0036220 A1 * | 2/2016 | Lacaux | ..................... | H02J 1/12 307/9.1 |
| 2016/0046247 A1 * | 2/2016 | Rozman | .................. | B60R 16/03 290/8 |
| 2016/0069277 A1 * | 3/2016 | Meisner | .................... | F02C 9/28 60/773 |
| 2016/0236790 A1 * | 8/2016 | Knapp | .................... | B64C 11/44 |
| 2016/0325826 A1 * | 11/2016 | Swann | ................... | B64D 41/00 |
| 2016/0355272 A1 * | 12/2016 | Moxon | ................... | B64D 35/04 |
| 2016/0380437 A1 * | 12/2016 | Casimir | ................. | H02M 7/06 307/9.1 |
| 2017/0044989 A1 * | 2/2017 | Gemin | ...................... | F02C 7/32 |
| 2017/0057650 A1 * | 3/2017 | Walter-Robinson | ....................... H02J 7/0068 | |
| 2017/0066541 A1 * | 3/2017 | Rossotto | ................. | B64D 31/06 |
| 2017/0129617 A1 * | 5/2017 | Shah | ........................ | B64D 27/24 |
| 2017/0175565 A1 * | 6/2017 | Sennoun | .................. | F02C 6/14 |
| 2017/0184032 A1 * | 6/2017 | Poumarede | ................ | F02C 7/36 |
| 2017/0225794 A1 | 8/2017 | Waltner | | |
| 2017/0226933 A1 * | 8/2017 | Klonowski | ......... | H01M 10/625 |
| 2017/0291712 A1 * | 10/2017 | Himmelmann | .......... | F02C 3/34 |
| 2017/0294782 A1 * | 10/2017 | Navarro | .................. | H02M 7/68 |
| 2017/0297695 A1 | 10/2017 | Schaeffer et al. | | |
| 2018/0002025 A1 * | 1/2018 | Lents | ...................... | F01D 15/10 |
| 2018/0065755 A1 * | 3/2018 | Teicholz | ............... | F04D 29/321 |
| 2018/0079515 A1 * | 3/2018 | Harwood | ................. | H02J 3/472 |
| 2018/0141671 A1 * | 5/2018 | Anghel | ................. | B64D 27/10 |
| 2018/0141674 A1 * | 5/2018 | Bailey | ............... | H01M 8/04201 |
| 2018/0187604 A1 * | 7/2018 | Poumarede | ................ | F02C 9/42 |
| 2018/0194483 A1 * | 7/2018 | Schwöller | ............. | B64D 35/08 |
| 2018/0222597 A1 * | 8/2018 | Covington | ............ | B64D 35/00 |
| 2018/0319283 A1 * | 11/2018 | Battin | .................. | B60K 15/063 |
| 2018/0354631 A1 * | 12/2018 | Adibhatla | ............. | B64D 35/08 |
| 2018/0354632 A1 * | 12/2018 | Hon | ....................... | B64D 31/06 |
| 2018/0370646 A1 * | 12/2018 | Hon | ....................... | B64D 27/18 |
| 2019/0000195 A1 * | 1/2019 | Golay | ............... | G04B 37/1486 |
| 2019/0003397 A1 * | 1/2019 | Gansler | .................. | F02C 7/26 |
| 2019/0003398 A1 * | 1/2019 | Gibson | ................... | H02J 3/381 |
| 2019/0155282 A1 * | 5/2019 | Kim | ........................ | B64C 27/57 |
| 2019/0165708 A1 * | 5/2019 | Smith | ..................... | F02C 9/32 |
| 2019/0186284 A1 * | 6/2019 | Orkiszewski | ........... | F01D 25/34 |
| 2019/0345837 A1 * | 11/2019 | Bacic | ..................... | F02C 9/42 |
| 2019/0368500 A1 * | 12/2019 | Epstein | .................. | F04D 25/04 |
| 2020/0056546 A1 * | 2/2020 | Terwilliger | ............. | F02C 9/26 |
| 2020/0056551 A1 * | 2/2020 | Epstein | ..................... | F02C 3/04 |

(56) References Cited

U.S. PATENT DOCUMENTS

| | | |
|---|---|---|
| 2020/0079513 A1* | 3/2020 | Pastouchenko ........... F02K 1/18 |
| 2020/0095939 A1* | 3/2020 | Epstein .................. B64D 33/08 |
| 2020/0164975 A1 | 5/2020 | Robertson et al. |
| 2020/0182158 A1* | 6/2020 | Kupratis ............... F01D 21/003 |
| 2020/0248619 A1* | 8/2020 | Romero .................... F02C 9/18 |
| 2020/0248760 A1* | 8/2020 | Olson .................... B64D 35/08 |
| 2020/0284265 A1* | 9/2020 | Reepmeyer ........... F04D 27/001 |
| 2020/0408148 A1 | 12/2020 | Beauchesne-Martel et al. |
| 2021/0246837 A1* | 8/2021 | Romero .............. F04D 27/0269 |
| 2022/0063824 A1* | 3/2022 | Hiett ....................... F01D 15/10 |
| 2022/0063826 A1* | 3/2022 | Hiett ....................... B64D 27/10 |
| 2022/0065175 A1* | 3/2022 | McQuiston ............... F02C 9/28 |
| 2022/0065177 A1* | 3/2022 | McQuiston ............... F02C 9/48 |
| 2022/0251966 A1* | 8/2022 | Hiett ....................... F01D 11/22 |
| 2022/0252007 A1* | 8/2022 | Hiett ........................ F02K 5/00 |
| 2024/0017823 A1* | 1/2024 | Parsons .................. B64C 27/12 |

OTHER PUBLICATIONS

Covington, Charles Eric, et al.; "Supplemental Power Unit Transition"; U.S. Appl. No. 17/721,015, filed Apr. 14, 2022; 46 pages.

* cited by examiner

| SEGMENT | SEGMENT NAME | P Alt (ft) | OAT (C) | TIME (MINIMUM) | RPM (%) | AIRSPEED (ktas) |
|---|---|---|---|---|---|---|
| 1 | WARMUP | 2000 | 29.4 | 10 | 100 | 0 |
| 2 | HOGE | 2000 | 29.4 | 1 | 100 | 0 |
| 3 | CRUISE | 2000 | 29.4 | 51-53 | 100 | 152-157 |
| 4 | HOGE CAPABLE | 2000 | 29.4 | 0.001 | 100 | 0 |
| 5 | LOITER | 2000 | 29.4 | VARIABLE | 100 | 102 |
| 6 | CRUISE | 2000 | 29.4 | 49-51 | 100 | 158-165 |
| 7 | RESERVE | 2000 | 29.4 | 20 | 100 | 98 |

OPTIMIZING USAGE OF SUPPLEMENTAL ENGINE POWER

STATEMENT REGARDING FEDERALLY SPONSORED RESEARCH OR DEVELOPMENT

This invention was made with government support under Agreement No. W911W6-19-9-0002, awarded by the U.S. Army Contracting Command-Redstone Arsenal. The government has certain rights in the invention.

CROSS-REFERENCE TO RELATED APPLICATIONS

This patent application incorporates by reference the entire disclosure of U.S. patent application Ser. No. 17/342,963, filed on Jun. 9, 2021.

TECHNICAL FIELD

This disclosure relates in general to the field of aircraft, and more particularly, but not by way of limitation, to optimizing the distribution of power between main and supplemental engines.

BACKGROUND

This section provides background information to facilitate a better understanding of the various aspects of the disclosure. It should be understood that the statements in this section of this document are to be read in this light, and not as admissions of prior art.

Conventionally, certain rotorcraft have employed some level of rotor speed control in a fly-by-wire flight control system. For example, rotor speed can be controlled by an engine control unit. However, controlling rotor speed with the engine control unit of a supplemental engine may have shortcomings.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, in an embodiment, an aircraft includes a drive system, a main engine coupled to the drive system to provide first power, and a supplemental engine coupled to the drive system to provide second power additive to the first power. The aircraft also includes a control system to control the main engine and the supplemental engine to optimize usage of the supplemental engine. The control system is operable to maintain the supplemental engine in a reduced power state at least until a determination is made that supplemental power is needed to satisfy a total power demand of the drive system. The control system is also operable to determine that supplemental power is needed to satisfy the total power demand of the drive system. The control system is further operable to increase a power level of the supplemental engine in response to the determination that supplemental power is needed. Other embodiments of this aspect include corresponding computer systems, apparatus, and computer programs recorded on one or more computer storage devices, each configured to perform the actions of the methods.

In another general aspect, in an embodiment a computer system includes a processor and memory. The processor and the memory in combination are operable to implement a method. The method includes operating an aircraft that includes a multi-engine drive system such that a main engine applies a first power to the multi-engine drive system and such that a supplemental engine applies a second power to the multi-engine drive system. The method also includes maintaining the supplemental engine in a reduced power state at least until a determination is made that supplemental power is needed to satisfy a total power demand of the multi-engine drive system. The method also includes determining that supplemental power is needed to satisfy the total power demand of the multi-engine drive system. The method also includes increasing a power level of the supplemental engine in response to the determining. Other embodiments of this aspect include corresponding computer systems, apparatus, and computer programs recorded on one or more computer storage devices, each configured to perform the actions of the methods.

In an embodiment, another general aspect includes a method. The method includes operating an aircraft that includes a multi-engine drive system such that a main engine applies a first power to the multi-engine drive system and such that a supplemental engine applies a second power to the multi-engine drive system. The method also includes maintaining the supplemental engine in a reduced power state at least until a determination is made that supplemental power is needed to satisfy a total power demand of the multi-engine drive system. The method also includes determining that supplemental power is needed to satisfy the total power demand of the multi-engine drive system. The method also includes increasing a power level of the supplemental engine in response to the determining. Other embodiments of this aspect include corresponding computer systems, apparatus, and computer programs recorded on one or more computer storage devices, each configured to perform the actions of the methods.

This summary is provided to introduce a selection of concepts that are further described below in the detailed description. This summary is not intended to identify key or essential features of the claimed subject matter, nor is it intended to be used as an aid in limiting the scope of claimed subject matter.

BRIEF DESCRIPTION OF THE DRAWINGS

The disclosure is best understood from the following detailed description when read with the accompanying figures. It is emphasized that, in accordance with standard practice in the industry, various features are not drawn to scale. In fact, the dimensions of various features may be arbitrarily increased or reduced for clarity of discussion.

DETAILED DESCRIPTION

It is to be understood that the following disclosure provides many different embodiments, or examples, for implementing different features of various illustrative embodiments. Specific examples of components and arrangements are described below to simplify the disclosure. These are, of course, merely examples and are not intended to be limiting. For example, a figure may illustrate an illustrative embodiment with multiple features or combinations of features that are not required in one or more other embodiments and thus a figure may disclose one or more embodiments that have fewer features or a different combination of features than the illustrated embodiment. Embodiments may include some but not all the features illustrated in a figure and some embodiments may combine features illustrated in one figure with features illustrated in another figure. Therefore, combinations of features disclosed in the following detailed description may not be necessary to practice the teachings in the broadest sense and are instead merely to describe particularly representative examples. In addition, the disclosure may repeat reference numerals and/or letters in the various examples. This repetition is for the purpose of simplicity and clarity and does not itself dictate a relationship between the various embodiments and/or configurations discussed.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "inboard," "outboard," "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction. As used herein, the terms "connect," "connection," "connected," "in connection with," and "connecting" may be used to mean in direct connection with or in connection with via one or more elements. Similarly, the terms "couple," "coupling," and "coupled" may be used to mean directly coupled or coupled via one or more elements. Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include such elements or features.

Figure 1:
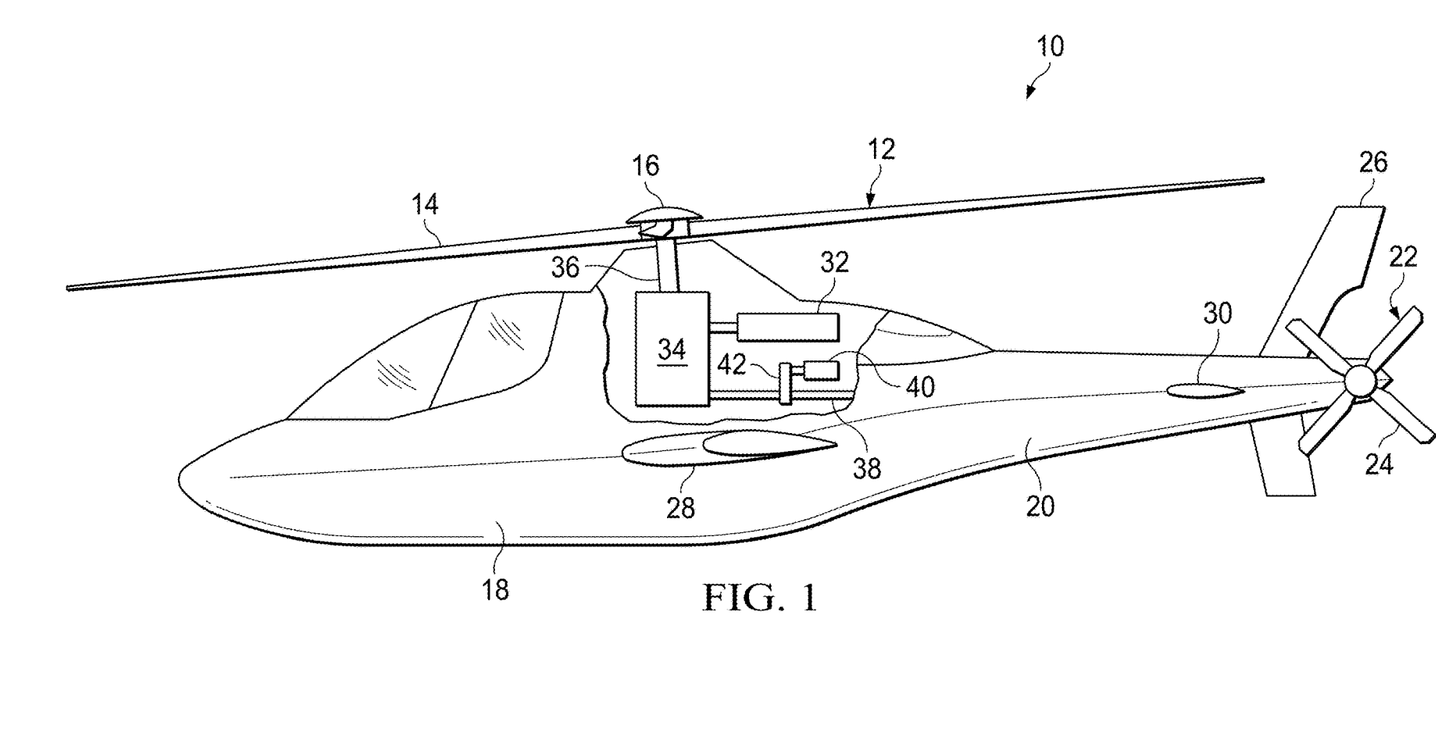
FIG. 1 is a schematic illustration of an illustrative rotorcraft implementing a supplemental engine power control system according to one or more aspects of the disclosure.

Referring to FIG. 1, a rotorcraft in the form of a helicopter is schematically illustrated and generally designated 10. The primary propulsion assembly of the helicopter 10 is a main rotor assembly 12. The main rotor assembly 12 includes a plurality of rotor blades 14 extending radially outward from a main rotor hub 16. The main rotor assembly 12 is coupled to a fuselage 18 and is rotatable relative thereto. The pitch of the rotor blades 14 can be collectively and/or cyclically manipulated to selectively control direction, thrust, and lift of the helicopter 10. A tailboom 20 is coupled to the fuselage 18 and extends from the fuselage 18 in the aft direction. An anti-torque system 22 includes a tail rotor assembly 24 coupled to an aft end of the tailboom 20. The anti-torque system 22 controls yaw of the helicopter 10 by counteracting torque exerted on the fuselage 18 by the main rotor assembly 12. In the embodiment in FIG. 1, the helicopter includes a vertical tail fin 26 that provides stabilization to the helicopter 10 during high-speed forward flight. In addition, the helicopter 10 includes wing members 28 that extend laterally from the fuselage 18 and wing members 30 that extend laterally from the tailboom 20. The wing members 28, 30 provide lift to the helicopter 10 responsive to the forward airspeed of the helicopter 10, thereby reducing lift requirements imposed on the main rotor assembly 12 and increasing top speed of the helicopter 10.

The main rotor assembly 12 and the tail rotor assembly 24 receive torque and rotational energy from a main engine 32. The main engine 32 is coupled to a main rotor gearbox 34 by suitable clutching and shafting. The main rotor gearbox 34 is coupled to the main rotor assembly 12 by a mast 36 and is coupled to the tail rotor assembly 24 by a tail rotor drive shaft 38. In the embodiment illustrated in FIG. 1, a supplemental engine 40 (i.e., supplemental power unit) is coupled to the tail rotor drive shaft 38 by a supplemental engine gearbox 42 that provides suitable clutching therebetween. In other embodiments, the supplemental engine 40 is coupled directly to the main rotor gearbox 34. Together, the main engine 32, the main rotor gearbox 34, the tail rotor drive shaft 38, the supplemental engine 40, and the supplemental engine gearbox 42, as well as the various other shafts and gearboxes coupled therein, may be considered as a torque-summing powertrain of the helicopter 10. In various embodiments, the supplemental engine 40 is operable as a supplemental power unit ("SPU") to provide supplemental power that is additive to the power provided by the main engine 32.

The helicopter 10 is merely illustrative of a variety of aircraft that can implement the principles disclosed herein. Indeed, the torque-summing powertrain of the present disclosure may be implemented on any rotorcraft. Other aircraft implementations can include hybrid aircraft, tiltwing aircraft, tiltrotor aircraft, quad tiltrotor aircraft, fixed-wing aircraft, unmanned aircraft, gyrocopters, propeller-driven airplanes, compound helicopters, drones, and the like. As such, those skilled in the art will recognize that the torque-summing powertrain of the present disclosure can be integrated into a variety of aircraft configurations. It should be appreciated that, even though aircraft are particularly well-suited to implement principles of the present disclosure, non-aircraft vehicles and devices can also implement the principles disclosed herein.

Figure 2:
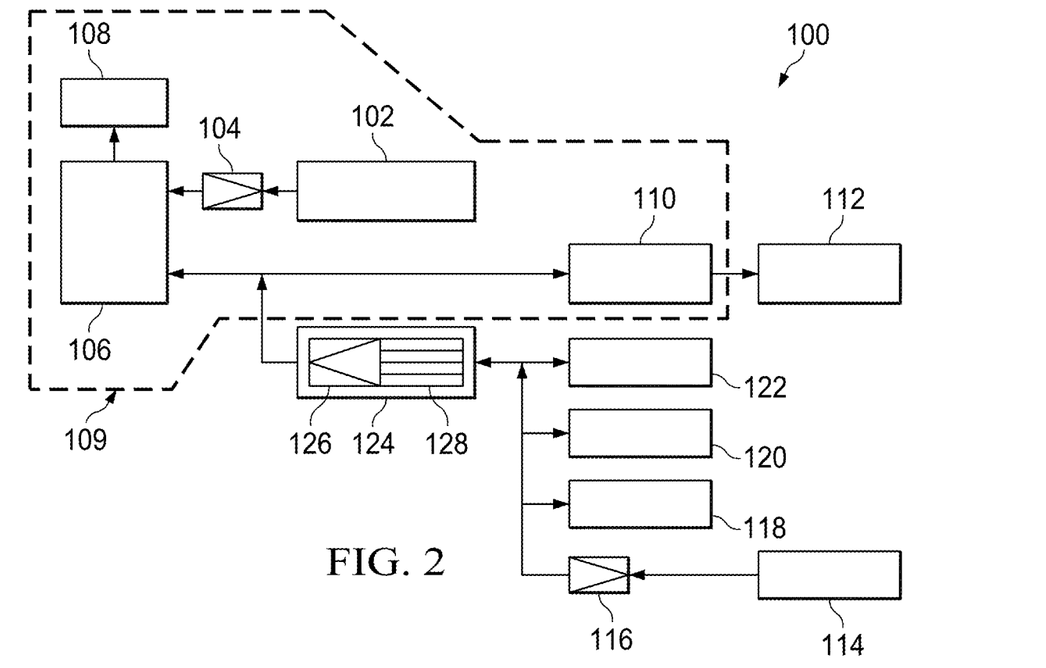
FIG. 2 is block diagram illustrating an illustrative main engine and supplemental engine torque-summing powertrain according to one or more aspects of the disclosure.

Referring also to FIG. 2, an illustrative torque-summing powertrain 100 for a rotorcraft is illustrated in a block diagram format. The torque-summing powertrain 100 includes a main engine 102, such as, for example, a turboshaft engine capable of producing 2,000 to 4,000 horsepower, or more or less, depending upon the particular implementation. The main engine 102 is coupled to a freewheeling unit depicted as sprag clutch 104 that acts as a one-way clutch enabling a driving mode, wherein torque from the main engine 102 is coupled to the main rotor gearbox 106 when the input side rotating speed to the sprag clutch 104 is matched with the output side rotating speed from the sprag clutch 104. For convenience of illustration, the input side of the sprag clutch 104 is depicted as the apex of the greater than symbol and the output side of the sprag clutch 104 is depicted as the open end of the greater than symbol. The sprag clutch 104 has an overrunning mode in which the main engine 102 is decoupled from the main rotor gearbox 106 when the input side rotating speed of the sprag clutch 104 is less than the output side rotating speed of the sprag clutch 104. Operating the sprag clutch 104 in the overrunning mode allows, for example, the main rotor 108 of the helicopter 10 to engage in autorotation in the event of a failure of the main engine 102.

In the illustrated embodiment, the main rotor gearbox 106 is coupled to the sprag clutch 104 via a suitable drive shaft. In addition, the main rotor gearbox 106 is coupled to the main rotor 108 by a suitable mast. The main rotor gearbox 106 includes a gearbox housing and a plurality of gears, such as planetary gears, used to adjust the engine output to a suitable rotational speed so that the main engine 102 and the main rotor 108 may each rotate at optimum speed during flight operations of the helicopter 10. The main rotor gearbox 106 may be coupled to a tail rotor gearbox 110 via a suitable tail rotor drive shaft. The tail rotor gearbox 110 includes a gearbox housing and a plurality of gears that may adjust the main rotor gearbox output to a suitable rotational speed for operation of the tail rotor 112. The main engine 102, the sprag clutch 104, the main rotor gearbox 106, and the tail rotor gearbox 110, as well as the various shafts and gearing systems coupled therewith are shown as a main drive system 109 of the torque-summing powertrain 100.

The torque-summing powertrain 100 includes a supplemental engine 114, such as, for example, a turboshaft engine capable of producing 200 to 600 horsepower, or more or less, depending upon the particular implementation. In the illustrated embodiment, the supplemental engine 114 may generate between about 5% and about 20% of the horsepower of the main engine 102, or more or less, depending upon the particular implementation. In other embodiments, the supplemental engine 114 may generate between about 10% and about 15% of the horsepower of the main engine 102. The supplemental engine 114 is coupled to a freewheeling unit depicted as a sprag clutch 116 that acts as a one-way clutch enabling a driving mode, wherein torque from the supplemental engine 114 is coupled through the sprag clutch 116 from the input side to the output side. The sprag clutch 116 has an overrunning mode in which the supplemental engine 114 is decoupled from torque transfer with the sprag clutch 116 when the input side rotating speed of the sprag clutch 116 is less than the output side rotating speed of the sprag clutch 116. Operating the sprag clutch 116 in the overrunning mode allows, for example, the main engine 102 to drive the rotorcraft accessories such as one or more generators 118, one or more hydraulic pumps 120, or other accessories 122 when the supplemental engine 114 is not operating. The supplemental engine 114 and the sprag clutch 116 as well as the various shafts and gearing systems coupled therewith may be considered a secondary drive system of the torque-summing powertrain 100.

Disposed between the main drive system 109 and the secondary drive system of the torque-summing powertrain 100 is a selectable clutch assembly 124 that has a unidirectional torque transfer mode and a bidirectional torque transfer mode. In the unidirectional torque transfer mode of the selectable clutch assembly 124, torque can be driven from the main drive system 109 to the secondary drive system of the torque-summing powertrain 100 but torque cannot be driven from the secondary drive system to the main drive system 109 of the torque-summing powertrain 100. In the bidirectional torque transfer mode of the selectable clutch assembly 124, torque can be driven from the main drive system 109 to the secondary drive system of the torque-summing powertrain 100 and torque can be driven from the secondary drive system to the main drive system 109 of the torque-summing powertrain 100. In the illustrated embodiment, the selectable clutch assembly 124 includes a freewheeling unit depicted as a sprag clutch 126 and a bypass assembly 128. The sprag clutch 126 acts as a one-way clutch enabling a driving mode, wherein torque from the main drive system 109 is coupled through the sprag clutch 126 from the input side to the output side. The sprag clutch 126 also has an overrunning mode wherein the main drive system 109 is decoupled from torque transfer with the sprag clutch 126 when the input side rotating speed of the sprag clutch 126 is less than the output side rotating speed of the sprag clutch 126. When the overrunning mode of the sprag clutch 126 is enabled, the selectable clutch assembly 124 is in the unidirectional torque transfer mode. The overrunning mode of the selectable clutch assembly 124 can be disabled by engaging the bypass assembly 128 with the sprag clutch 126. When the bypass assembly 128 prevents the sprag clutch 126 from operating in the overrunning mode, the selectable clutch assembly 124 is in the bidirectional torque transfer mode.

When the main engine 102 is operating, torque is delivered through the main drive system 109 as indicated by the solid lines and arrowheads between the components within the main drive system 109. In addition, as the main drive system 109 is turning, torque may be applied to the selectable clutch assembly 124. As discussed herein, in order to shift the selectable clutch assembly 124 from the unidirectional torque transfer mode to the bidirectional torque transfer mode, power should be applied to the input side of the sprag clutch 126 from the main drive system 109 such that the input side and the output side of the sprag clutch 126 are turning together. The bypass assembly 128 can now be actuated from the disengaged position to the engaged position, placing the selectable clutch assembly 124 in the bidirectional torque transfer mode. The operations of engaging and disengaging the bypass assembly 128 may be pilot controlled and/or may be automated by the flight control computer of the helicopter 10 and may be determined according to the operating conditions of the helicopter 10. In this configuration, power from the supplemental engine 114 augments the power of the main engine 102 within the main drive system 109, as indicated by the solid lines and arrowhead from the selectable clutch assembly 124 to the main drive system 109. This configuration may be referred to as the enhanced power configuration of the torque-summing powertrain 100 wherein the main engine 102 and the supplemental engine 114 are operating together and the selectable clutch assembly 124 is in the bidirectional torque transfer mode. The selectable clutch assembly 124 may be engaged and additive supplemental power applied to the main rotor during normal operations in which the load that on the main engine is sufficient to govern the rotor speed. For example, the selectable clutch assembly 124 may not be engaged if the supplemental power would reduce the load on the main engine below that under which the main engine can govern rotor speed. Aspects of the torque-summing powertrain 100 are disclosed in US Patent App. Publication No. 2020/0248760, which is incorporated herein by reference.

Figure 3:
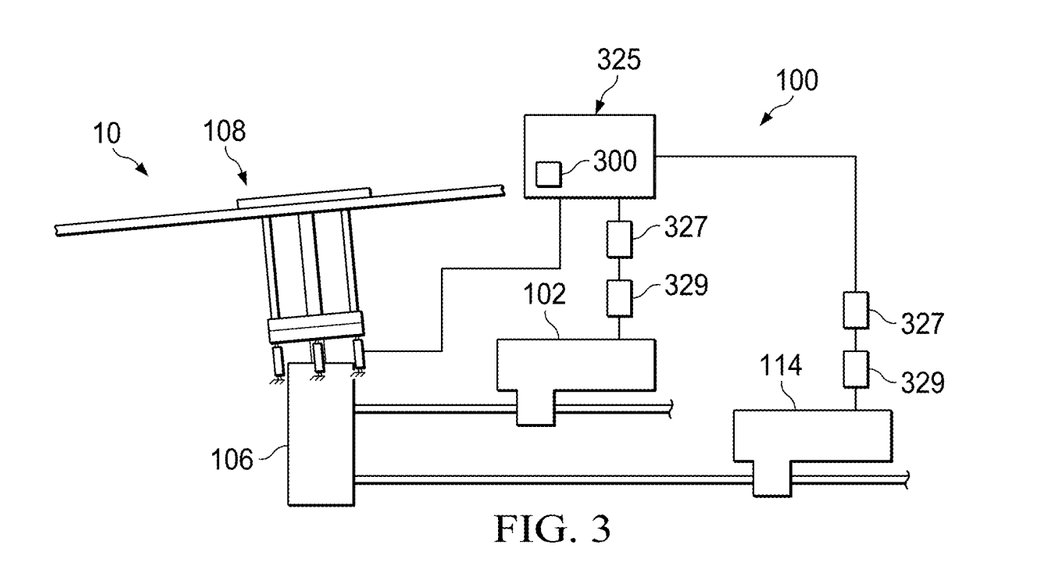
FIG. 3 is a schematic illustration of a rotorcraft powertrain with an illustrative system for implementing supplemental engine power control.
Figure 4:
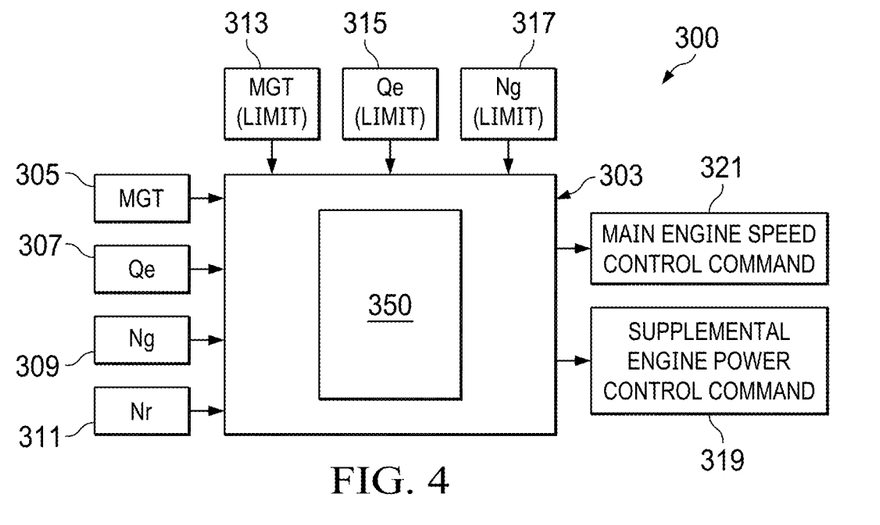
FIG. 4 is a schematic illustration of a system for calculating and commanding rotor speed control of a main engine and commanding power control of a supplemental engine according to one or more aspects of the disclosure.

Referring now also to FIGS. 3 and 4, a system 300 is illustrated in conjunction with the helicopter 10 and the torque-summing powertrain 100. It should be appreciated that though system 300 is illustrated with regard to the helicopter 10, the system 300 may also be implemented on other aircraft. Further, it should be appreciated that the system 300 can be implemented in a wide variety of configurations, depending in part on the flight control configuration of the aircraft.

The system 300 is particularly well-suited for implementation in aircraft having a fly-by-wire flight control computer, such as a flight control computer 325; however, non-fly-by-wire aircraft can also utilize the system 300. For example, the system 300 can be utilized in a flight control system having collective actuators that can receive commands from a trim motor, autopilot system, or any other system that allows collective commands to be realized by collective actuators. Further, the system 300 is particularly well suited for implementation with aircraft having engines controlled by an engine control unit 327, such as a FADEC (full authority digital engine control) system. However, the system 300 can also be implemented on an aircraft having an engine that is not controlled by an engine control unit such as the engine control unit 327; in such an embodiment, the system 300 can make fuel control commands directly to a fuel control unit 329, for example. The system 300 is preferably integrated with a flight control computer 325; however, in another embodiment, the system 300 can be a standalone computer system within the aircraft.

The system 300 can include a processor 303 configured for processing receivable data in one or more algorithms 350 for calculating total power demand, supplemental power demands, and subsequently making commands, e.g., a main engine speed command, and supplemental engine power command, to adaptively affect rotor speed. The processor 303 can receive real time operational data from sensors, instrumentation, and the like. For each of the main engine and the supplemental engine, the processor 303 can separately receive real time data pertaining to a measured gas temperature (MGT) 305, engine torque (Qe) 307, gas generator speed (Ng) 309 approximating power, and rotor speed (Nr) 311, which corresponds to a power-turbine speed (Np). In similar fashion, the main engine and the supplemental engine can each have separate allowable engine limits, such as a MGT limit 313, a gas generator speed limit 317, and a torque (Qe) limit 315. For each of the main engine and the supplemental engine, the MGT limit 313, the gas generator speed limit 317, and the torque (Qe) limit 315 are in data communication with processor 303 and can be stored in a database within the processor 303, or can be stored remotely, as long as such limits are available for analysis. The processor 303 is configured to perform analysis using one or more algorithms and subsequently issue supplemental engine power commands 319 and a main engine speed command 321.

The main engine 102 and the supplemental engine 114 are different sizes, i.e., different horsepower ratings, and may be from different manufacturers. The system 300 is configured to separately control the main engine 102 and the supplemental engine 114 to supply total power required to maintain the main rotor speed within an acceptable range. The system 300 controls the main engine 102 to govern the main rotor speed (Nr), for example in similar manner as with a conventional single engine or twin-engine powertrain. The system 300 implements the supplemental engine 114 power control via an Ngs (supplemental-engine gas generator speed) command to provide a proportion of the total power demand, which is subtracted from the main engine 102 power compensation command. The supplemental engine 114 only receives a supplemental power demand and does not respond to changes in rotor speed. The system 300 facilitates operating the supplemental engine 114 in the enhanced power configuration when the proportion of the total power demand of the main engine 102 is sufficient for the main rotor speed to be governed by the main engine 102.

A system computed main engine power compensation command is used to adjust the power output of the main engine to reduce rotor speed variation in response to load variations. The main engine power compensation command may be calculated by the system anticipating the power demand on the engine and transmitting the main engine power compensation command to the governor on the main engine to adjust the power output of the main engine. Non-limiting illustrative methods and systems for governing rotor speed are disclosed in US Patent Application Publication Nos. 2014/0252158, 2014/0363288, and 2018/0222597, each of which is incorporated herein by reference.

The system controls the supplemental engine to provide a proportion of the total power demand. The supplemental engine provides power in response to a system computed supplemental engine power demand signal, effectively decoupling the dynamics of the main engine and the supplemental engine. The main engine power compensation command is adjusted to account for the supplemental engine power demand. The supplemental engine power demand can be computed as a function of control inputs and flight conditions or in proportion to the total power demand. The supplemental engine power demand may be computed per schedule and limits.

Figure 5:
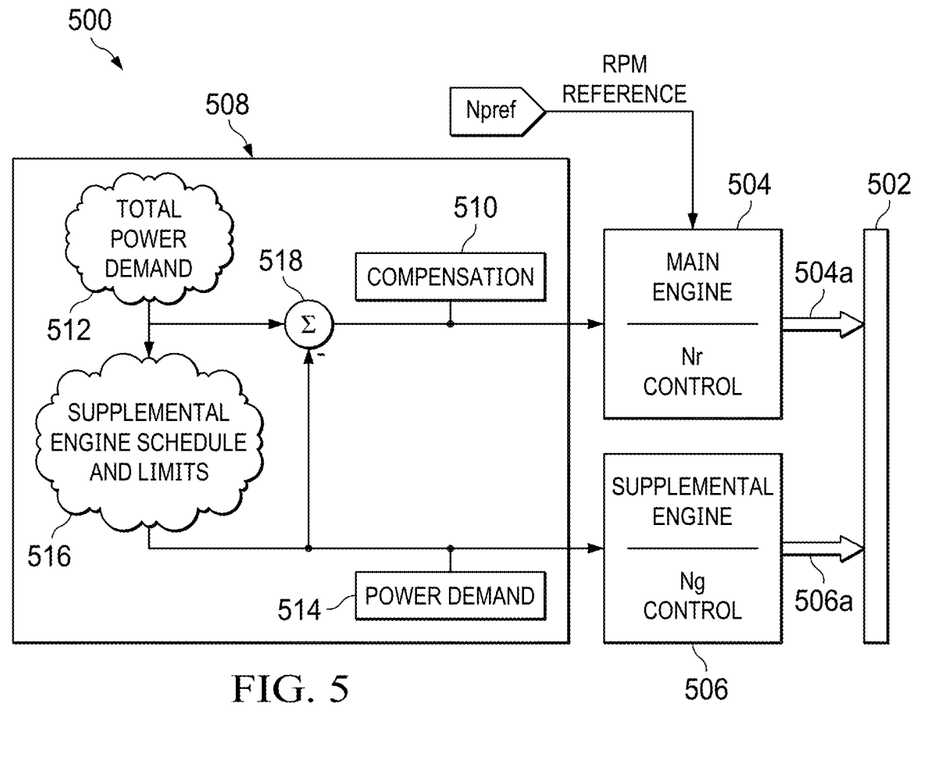
FIG. 5 is a schematic illustration of a rotorcraft implementing an illustrative supplemental engine power control system.

Referring also to FIG. 5, a rotorcraft 500 includes a main rotor drive system 502 (e.g., main rotor and main rotor gearbox) and a main engine 504 and a supplemental engine 506 coupled to the drive system. The supplemental engine 506 is smaller than the main engine 504; for example, the supplemental engine 506 may be approximately 20% of the size of the main engine 504. A computer 508 (e.g., flight computer) is configured to divide the control domain between the main engine 504 and the supplemental engine 506. The main engine 504 controls main rotor speed (Nr), which is proportional to main-engine power turbine speed (Np), for example in a similar fashion to a traditional system with a single turboshaft engine or twin identical engines. The main engine 504 provides power to maintain the main rotor speed with a level of compensation for load variation. The main engine 504 has an engine controller that measures the main rotor speed (Nr) and adjusts main engine power 504a to reduce RPM variation in response to load variations. The computer 508 can communicate a main engine power compensation command 510 to the main engine 504 (e.g., the power turbine) in anticipation of the load variations for example due to flight conditions, ambient conditions, and pilot inputs.

The supplemental engine 506 works to satisfy a power demand as opposed to the main engine 504 which works to satisfy an RPM demand. Total power demand 512 is calculated for what the rotorcraft 500 is currently doing and is routed toward the main engine 504 as the power compensation command. A portion of total power demand 512 is allocated to the supplemental engine 506, as a supplemental engine power demand 514, based on logic 516 (e.g., schedules and limits). Different techniques can be used to control the supplemental engine 506. For example, the supplemental engine power demand 514 may be supplemental-engine gas generator speed (Ngs) based (demanding Ngs is proportional to power), measured gas temperature (MGT) based (demanding a temperature), fuel flow (WF) based (demanding a rate of fuel flow), or engine torque (Qe) based (demanding a torque). Ambient correction and low frequency closed-loop correction may be applied to reduce errors, if necessary.

To mitigate supplemental engine power 506a from being perceived by the main engine 504 as a disturbance, supplemental engine power demand 514 is subtracted at block 518 from total power demand 512, resulting in main engine power compensation command 510.

The schedules are built to achieve certain attributes. For example, and without limitation, the supplemental engine should be at maximum power when regard for efficiency in some flight envelopes and for safety. The supplemental power demand is forced to maximum power for autorotation if the main engine fails or due to rotor speed droop, which is indicative of a main engine failure. In low-power conditions, the supplemental engine power demand is reduced to ensure adequate load remains on the main engine so that it can continue to govern rotor speed. A low limit may be placed on the supplemental engine power demand to ensure that the supplemental engine sprag clutch, e.g., the clutch 126 of the selectable clutch 124, remains engaged. The high limit takes priority over the low limit during normal operation when the main engine is controlling rotor speed. Limits, gains, and other parameters can be varied with flight condition to optimize performance. Supplemental engine limiting loops, such as MGT, Ngs, and Qe, may be utilized, and the system control algorithm adjusts when the limiting loops are active. The supplemental engine power demand control may have a supplemental-engine power-turbine speed (Nps) loop in case of overspeed, for example approximately 3%, to switch the supplemental engine to rotor speed (RPM) command to avoid increasing the rotor overspeed.

Figure 6:
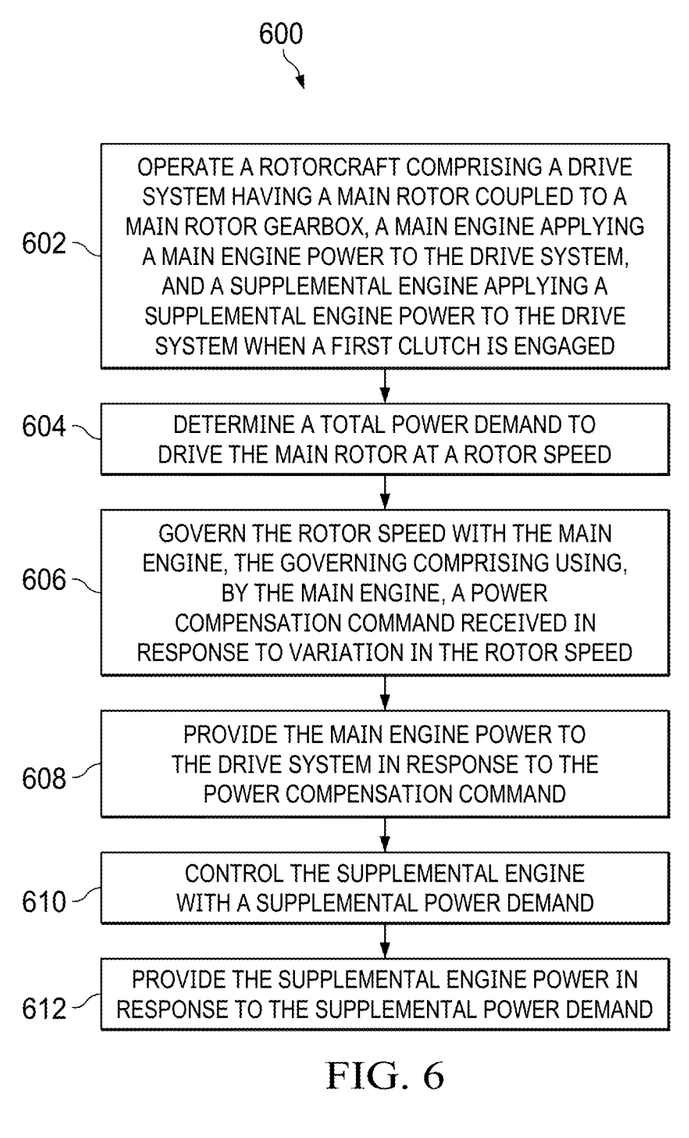
FIG. 6 is a flow diagram of an illustrative method of supplemental engine power control.

FIG. 6 illustrates an illustrative method 600 for power control of a supplemental engine, which is described with additional reference to FIGS. 1-5. At block 602, a rotorcraft is operated. The rotorcraft includes a drive system having a main rotor coupled to a main rotor gearbox. A main engine applies a main engine power to the drive system and a supplemental engine applies a supplemental engine power to the drive system when a first clutch, e.g., clutch 126 (FIG. 2), is engaged. At block 604, a total power demand, to drive the main rotor at a rotor speed, is determined. The total power demand accounts the main engine power and the supplemental engine power. At block 606, the main engine governs the rotor speed. The governing comprises, for example, using a power compensation command generated in response to anticipated load variations to reduce rotor speed variation. At block 608, the main engine power is provided to the drive system in response to receiving the power compensation command. At block 610, the supplemental engine is controlled with a supplemental power demand. At block 612, the supplemental engine power is provided to the drive system in response to the supplemental power demand.

In various embodiments, a distribution of power between the main engine (e.g., main engine 32) and the supplemental engine (e.g., the supplemental engine 114) can be optimized to improve fuel efficiency and/or other flight factors. For example, the supplemental engine can be maintained in a reduced power state until a determination is made that supplemental power is needed to satisfy a total power demand of the drive system. In general, the reduced power state represents a reduction relative to another power setting, such as maximum continuous power (MCP), in which the supplemental engine might otherwise operate by default. In various embodiments, the reduced power state can be the lowest power setting of the supplemental engine such as, for example, an IDLE state (e.g., approximately 65% RPM). As further examples, the reduced power state can be an OFF state of the supplemental engine.

Figure 7:
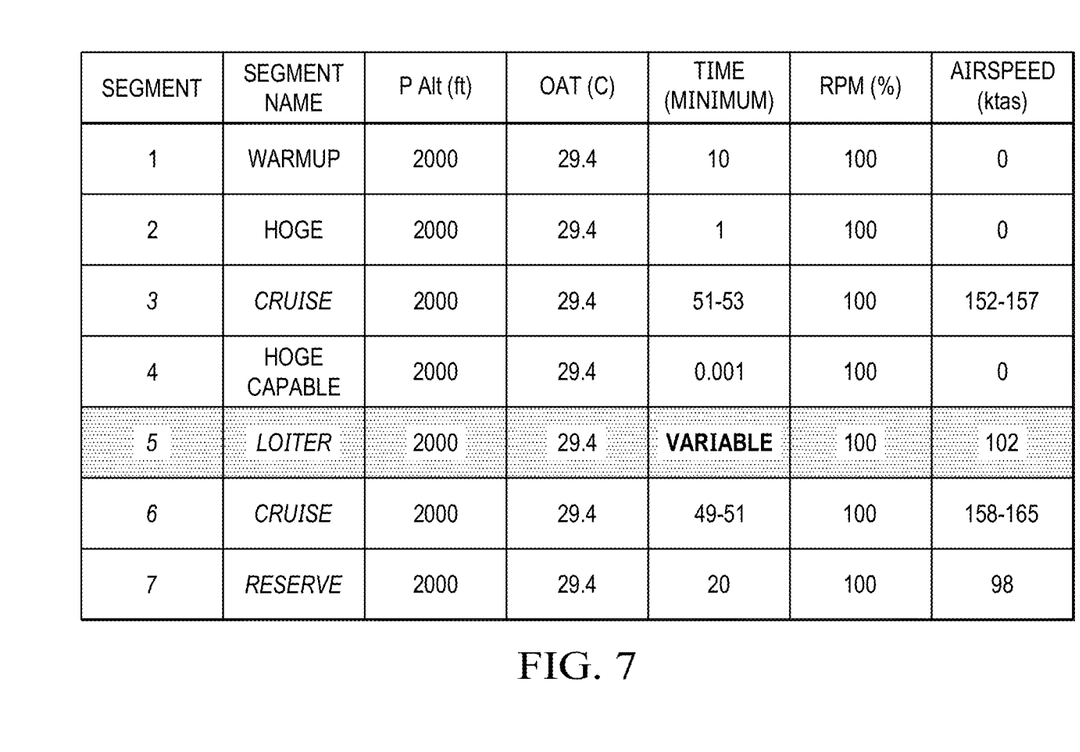
FIG. 7 illustrates an example of optimizing usage of the supplemental engine based on flight segment.

FIG. 7 illustrates an example of optimizing usage of the supplemental engine based on flight segment. In the example of FIG. 7, seven flight segments for an example mission are shown, namely: (1) warmup; (2) hovering out of ground effect (HOGE); (3) cruise; (4) HOGE capable; (5) loiter; (6) cruise; and (7) reserve. In various embodiments, the supplemental engine can be maintained in the reduced power state when the rotorcraft is in cruise (e.g., segments (3) and (6) in the example of FIG. 7). The supplemental engine can otherwise maintain an increased power level consistent with applicable logic such as schedules and limits. For example, the power level of the supplemental engine can be increased when the rotorcraft is no longer in cruise. In some cases, the supplemental engine can be operated at MCP for non-cruise segments.

In various embodiments, a particular flight segment associated with low power demand, such as cruise, can be detected automatically based on flight conditions such as, for example, airspeed (e.g., cruise can be detected if airspeed is between 150-170 knots true airspeed (KTAS)). In other embodiments, an indication of cruise and/or a determination to enter the reduced power state can be supplied manually via pilot command. Maintaining the supplemental engine in the reduced power state can produce various advantages such as extending loiter time, increasing range, and improving fuel efficiency.

Figure 8:
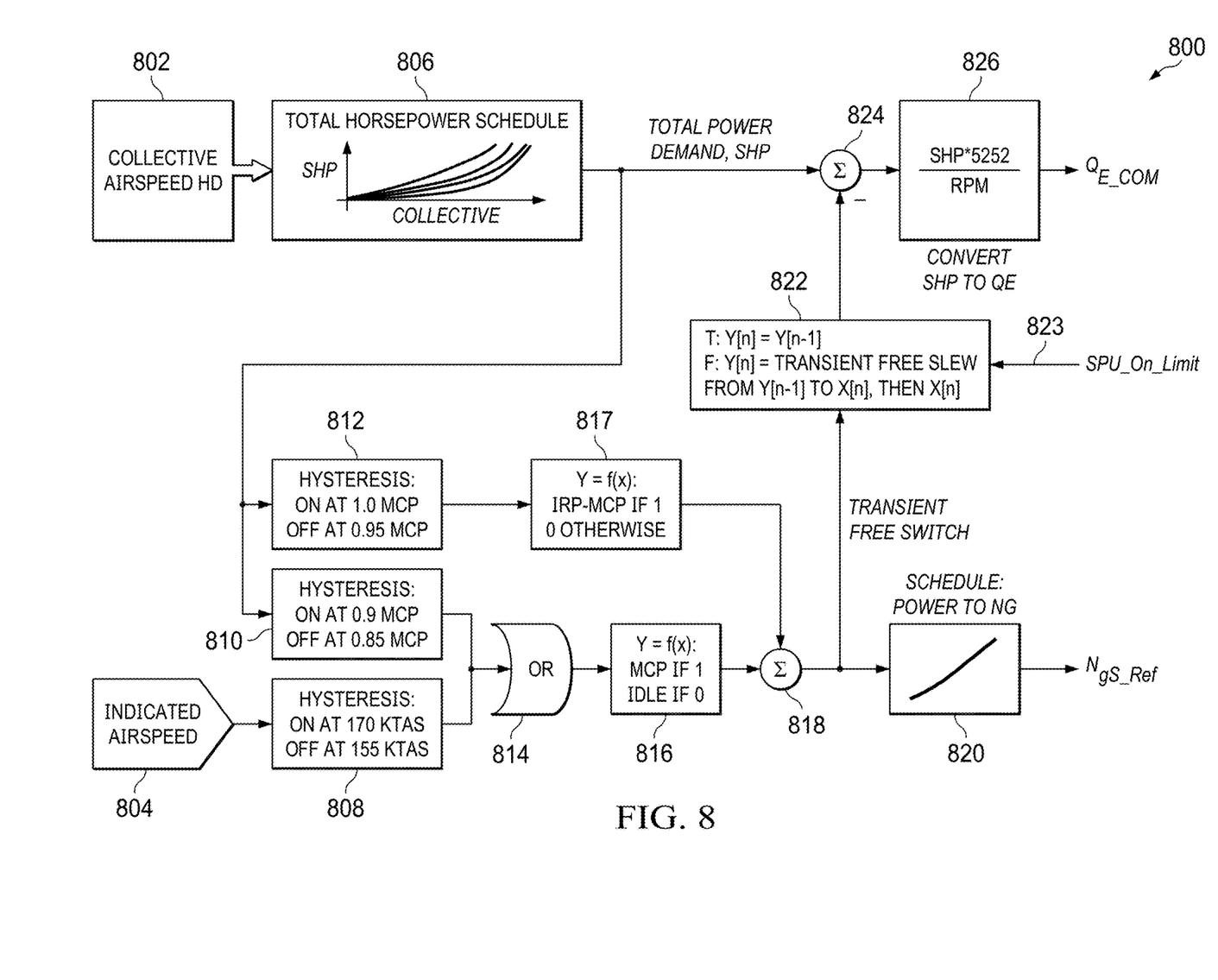
FIG. 8 illustrates an example of logic for optimizing usage of supplemental engine power.

FIG. 8 illustrates an example of logic 800 for optimizing usage of supplemental engine power based on flight conditions, ambient conditions and/or demand. In various embodiments, the logic 800 can be performed by a computer such as the computer 508 of FIG. 5. As shown, inputs 802 are provided to a total horsepower schedule 806 to produce a total power demand for the drive system, for example, in shaft horsepower (SHP). The inputs 802 can include, for example, flight control inputs, flight conditions, ambient conditions and/or the like. In the example of FIG. 8, the inputs 802 include collective position, airspeed, and density altitude (Hd). An airspeed input 804 is provided to a flag 808, while the total power demand is provided to the flag 810, the flag 812, and difference calculation 824 (described further below). In the example of FIG. 8, the flags 808, 810, and 812 are initially set to OFF.

The flag 808 is set to ON if the airspeed input 804 is at least a first airspeed threshold (e.g., 170 KTAS). Once the flag 808 is set to ON, it remains ON until the airspeed input 804 is no more than a second airspeed threshold (e.g., 155 KTAS), which value may be the same as or different from the first airspeed threshold. The flag 810 is set to ON if the total power demand is at least a first specified proportion of a rated power of the main engine (e.g., 0.9 MCP). Once the flag 810 is set to ON, it remains ON until the total power demand is no more than a second specified proportion of the rated power of the main engine (e.g., 0.85 MCP), which proportion may be the same as or different from the first specified proportion. The flag 812 is set to ON if the total power demand is at least a first specified proportion of a rated power of the main engine (e.g., 1.0 MCP). Once the flag 812 is set to ON, it remains ON until the total power demand is no more than a second specified proportion of the rated power of the main engine (e.g., 0.95 MCP), which proportion may be the as or different from the first specified proportion.

Outputs of the flags 808 and 810 are provided to an OR gate 814. If the flags 808 and 810 are both set to OFF, the OR gate 814 outputs a zero to block 816; otherwise, if one or both of the flags 808 and 810 are set to ON, the OR gate 814 outputs a one to block 816. At block 816, a power level of the supplemental engine is determined based on the output of the OR gate 814, and a corresponding supplemental power demand is output to summation 818. For example, if the output of the OR gate 814 is a zero, the supplemental power demand can correspond to an IDLE state of the supplemental engine (or a different reduced power state); otherwise, if the output of the OR gate is one, the supplemental power demand can be a calculated or determined value corresponding to a rated power of the supplemental engine (e.g., MCP).

Output of the flag 812 is provided to block 817, where additional supplemental power demand, if applicable, is determined based thereon. If the flag 812 is set to OFF, the additional supplemental power demand is determined to be zero; otherwise, if the flag 812 is set to ON, an additional supplemental power demand can be determined as a function, for example, of a rated power of the supplemental engine. For example, in the embodiments described above in which the block 816 utilizes MCP, the additional supplemental power demand can utilize intermediate rated power (IRP), where the additional supplemental power demand is an amount by which the IRP of the supplemental engine exceeds its MCP. As shown, the additional supplemental power demand is output to the summation 818.

At the summation 818, the supplemental power demand and the additional power supplemental demand, if any, are summed to produce a total supplemental power demand, which is output to both schedule 820 and block 822. The schedule 820 outputs a supplemental-engine gas generator speed ($N_{gs}$Ref) for implementation by the supplemental engine. As described further below, block 822, difference calculation 824, and conversion block 826, in combination, can be used to provide a compensation command similar to the main engine power compensation command 510 of FIG. 5.

As described previously, the block 822 receives total supplemental power demand from the summation 818. The block 822 also receives an on-limit indicator 823 that indicates whether the supplemental engine is already producing at its limit. Based on this information, the block 822 produces an adjusted supplemental-power value (e.g., Y[n]) that approximates supplemental power that will be produced by the supplemental engine in response to the supplemental-engine gas generator speed. In various embodiments, the block 822 can function as a transient free switch that, through each iteration, programmatically and configurably adjusts (e.g., increases) the adjusted supplemental-power value until it reaches the total supplemental power demand (e.g., X[n]). In this way, the block 822 can cause the adjusted supplemental-power value to adjust gradually, rather than suddenly, to the total supplemental power demand. However, in various embodiments, if the on-limit indicator 823 indicates that the supplemental engine is already producing at its limit (e.g., a value of TRUE), the block 822 can output the same value that was output in the most recent iteration (e.g., Y[n−1]). In some embodiments, the block 822 can be omitted such that the total supplemental power demand is passed directly from the summation 818 to the difference calculation 824.

The difference calculation 824 computes a difference between the total power demand from the total horsepower schedule 806 and the adjusted supplemental-power value from the block 822. This difference is output to the conversion block 826, where the difference is converted from SHP to engine torque (e.g., $Q_{E\_COM}$). The engine torque can be supplied to the main engine as a compensation command similar to the main engine power compensation command 510 of FIG. 5.

Figure 9:
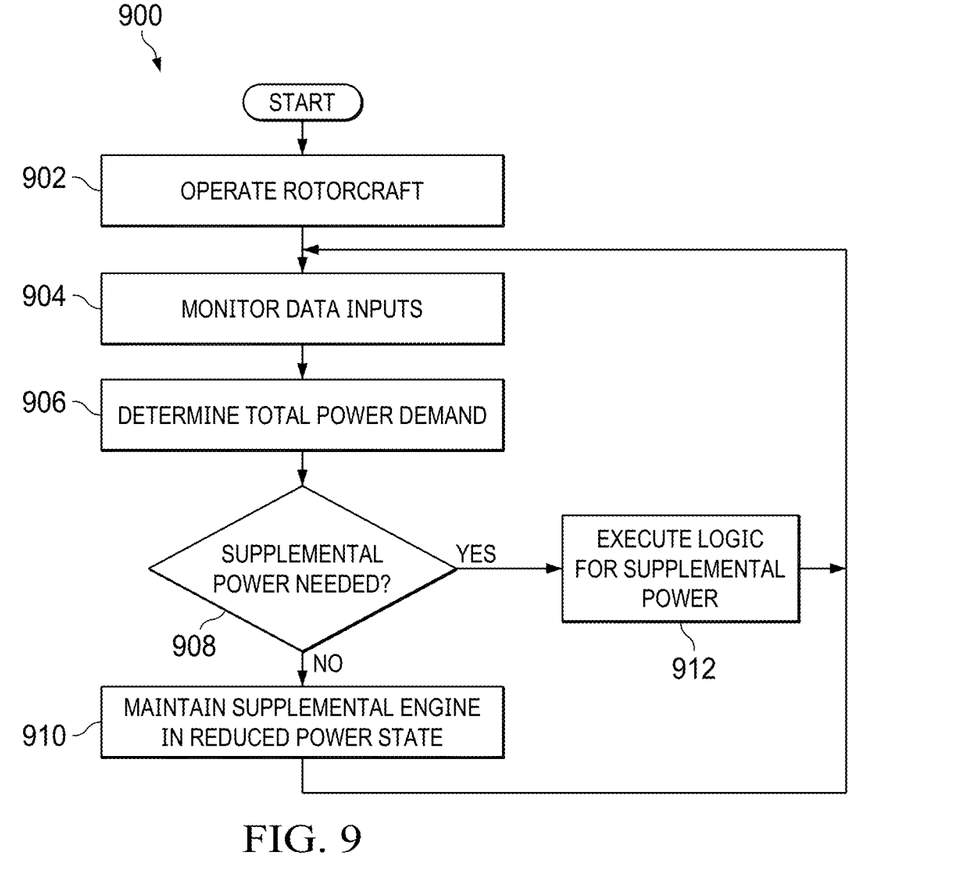
FIG. 9 illustrates a method for optimizing usage of supplemental engine power.

FIG. 9 illustrates a method 900 for optimizing usage of supplemental engine power, which is described with additional reference to FIGS. 1-8. The method 900 can begin, for example, at the start of a mission. In various embodiments, the method 900 can be performed, at least in part, by a computer such as the computer 508 of FIG. 5. At block 902, a rotorcraft is operated. The rotorcraft includes a multi-engine drive system having a main rotor coupled to a main rotor gearbox. A main engine applies a main engine power to the multi-engine drive system and a supplemental engine applies a supplemental engine power to the multi-engine drive system when a first clutch, e.g., clutch 126 (FIG. 2), is engaged. In general, the block 902 can include driving the main rotor by the main engine.

At block 904, data inputs are monitored. The data inputs can include, for example, control inputs, data indicative of flight conditions, data indicative of ambient conditions, etc. At block 906, a total power demand of the multi-engine drive system is determined. At decision block 908, it is determined whether supplemental power is needed to satisfy the total power demand of the multi-engine drive system. In some embodiments, as described relative to FIG. 7, the need for supplemental power can be determined based on flight segment. For example, in certain embodiments, if it is indicated, automatically or manually, that the rotorcraft is in cruise, it may be determined that supplemental power is not needed. Conversely, continuing this example, if it is indicated, automatically or manually, that the rotorcraft is not in cruise (or is no longer in cruise), it may be determined that supplemental power is needed. In addition, or alternatively, in some embodiments, as described relative to FIG. 8, the need for supplemental power can be determined based on flight conditions, ambient conditions, and/or demand.

If it is determined at the decision block 908 that supplemental engine power is not needed to satisfy the total power demand of the multi-engine drive system, the method 900 proceeds to block 910. At block 910, the supplemental engine is maintained in a reduced power state at least until a determination is made that supplemental power is needed to satisfy the total power demand of the multi-engine drive system. As described previously, in some embodiments, the reduced power state can correspond to the lowest power setting of the supplemental engine. The reduced power state can be, for example, an IDLE state, an OFF state, and/or the like. In general, the block 910 can involve keeping the supplemental engine in the reduced power state until configurable logic indicates, for example, that the rotorcraft is in no longer in cruise as described with respect to FIG. 7, or that supplemental power is otherwise needed as described with respect to FIG. 8.

If it is determined at the decision block 908 that supplemental engine power is needed to satisfy the total power demand, at block 912, logic is executed for supplemental power. In some embodiments, the logic that is applied can involve increasing a power level of the supplemental engine. In some embodiments, the power level of the supplemental engine can be increased to the MCP of the supplemental engine or to another rated power of the supplemental engine. From either block 910 or 912, the method 900 returns to the block 904 and executes as described previously. In various embodiments, the method 900 can continue until conclusion of a mission, until stopped by a pilot, or until other suitable stop criteria is satisfied.

Figure 10:
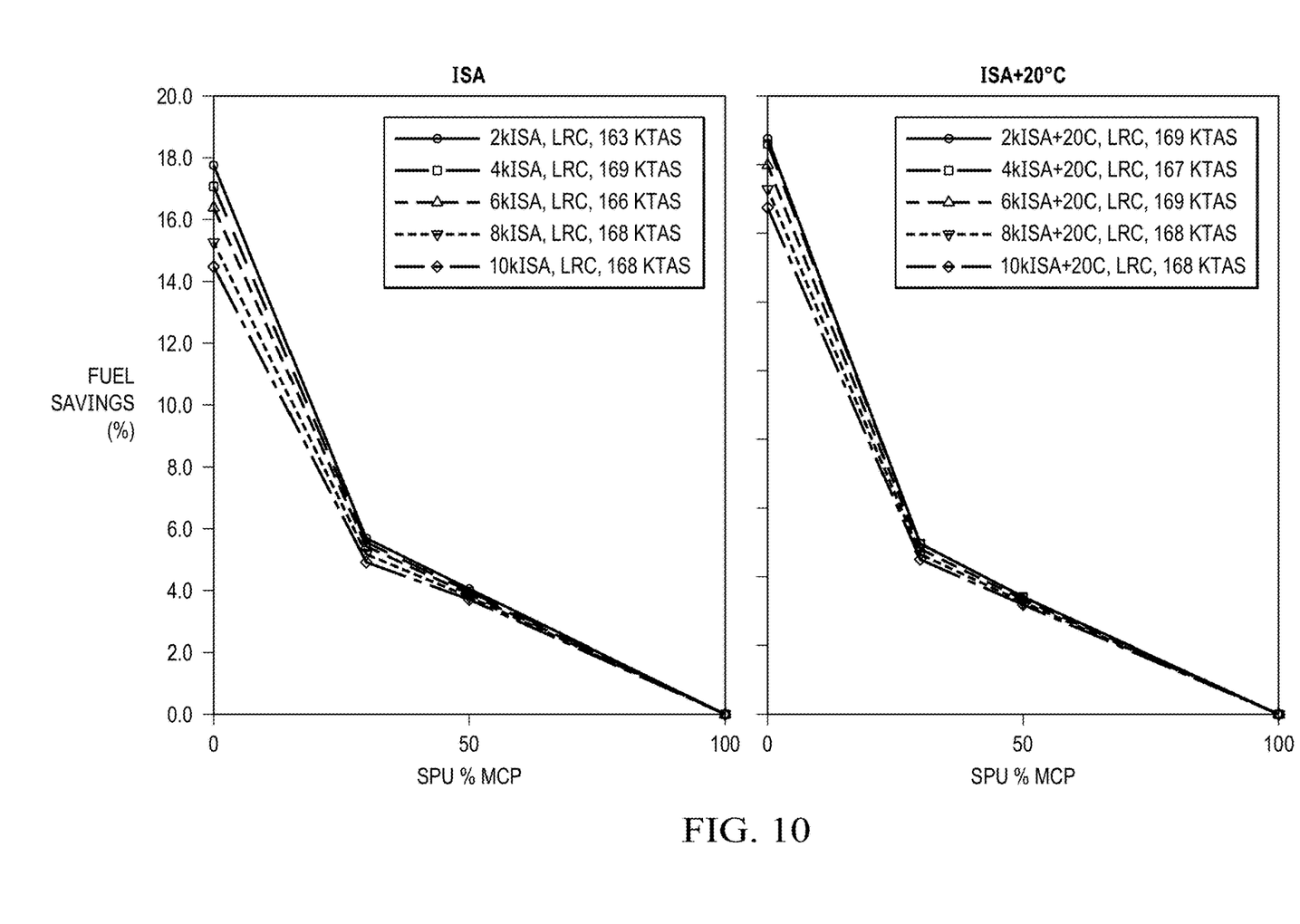
FIG. 10 illustrates example fuel-efficiency advantages of optimizing usage of supplemental engine power.

FIG. 10 illustrates example fuel-efficiency advantages of optimizing usage of supplemental engine power. In the example of FIG. 10, fuel savings (in percent) are shown relative to the supplemental engine's power level (shown as a percentage of MCP). In certain embodiments, approximately 30 percent of MCP approximates the IDLE state of the supplemental engine, although it should be appreciated that the IDLE state can vary by engine, engine configuration, and/or other factors.

Figure 11:
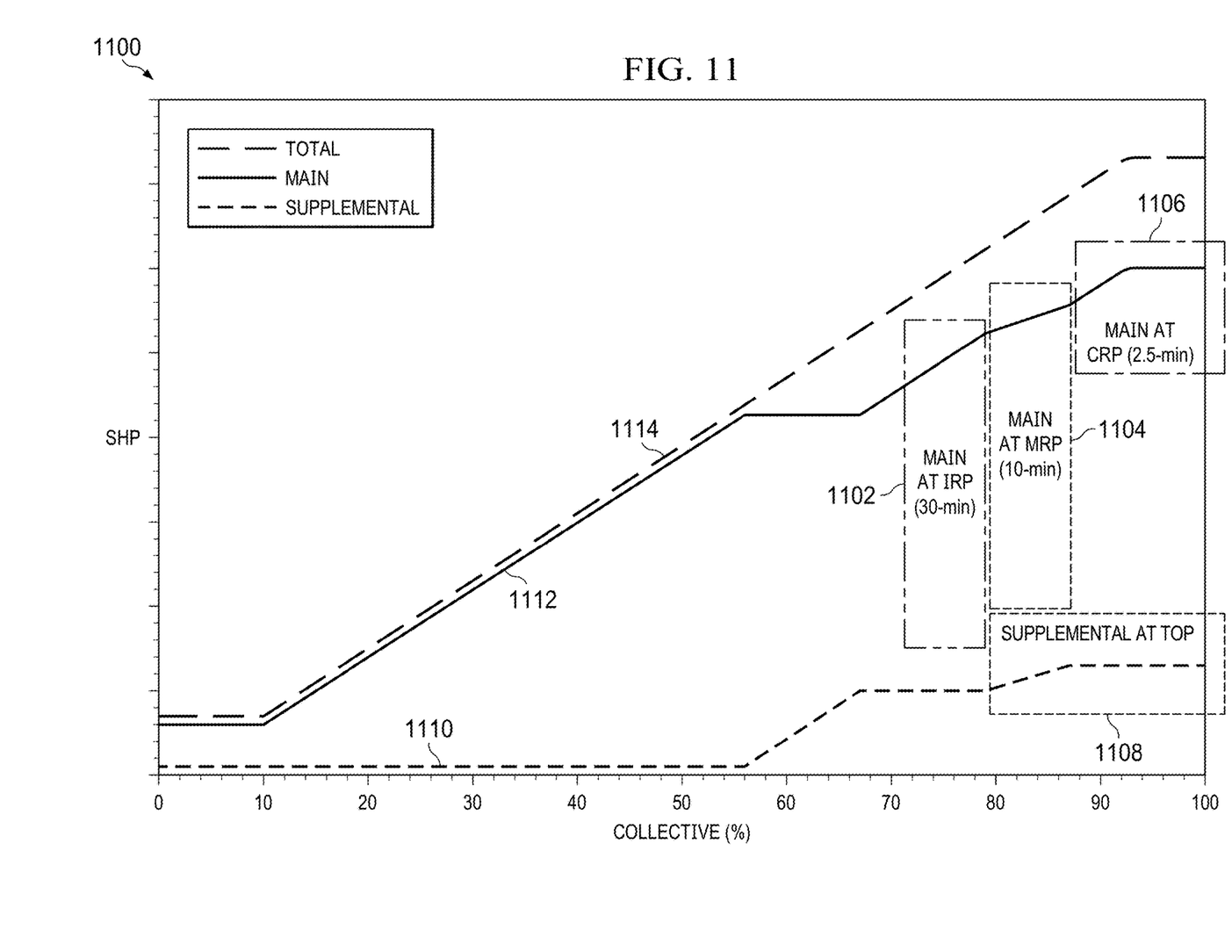
FIG. 11 illustrates an example of a graph that shows total power demand versus collective position.

FIG. 11 illustrates an example of graph 1100 that shows total power demand in SHP versus collective position. In certain embodiments, the graph 1100 can be displayed, for example, on a screen of a user device such as, for example, a computer system. The graph 1100 is overlayed with ratings from the main engine and the supplemental engine. More particularly, the graph 1100 includes time-limited zones 1102, 1104, 1106, and 1108. The graph 1100 also shows supplemental engine power 1110, main engine power 1112, and total power 1114.

The time-limited zones 1102, 1104, and 1106 correspond to the main engine operating at power levels corresponding to intermediate rated power (IRP), maximum rated power (MRP), and contingency rated power (CRP), respectively. The time-limited zone 1108 corresponds to the supplemental engine operating at a power level corresponding to take-off power (TOP). In some embodiments, the graph 1100, or a similar display, can be shown in real-time to a pilot or other personnel.

In the graph 1100, the main engine is shown to enter and exit the time-limited zone 1102 at the collective positions indicated. In the illustrated embodiment, the supplemental engine does not have a time-limited zone corresponding to the collective positions of the time-limited zone 1102. Somewhat differently, the time-limited zone 1108 of the supplemental engine spans the entire range of collective positions defined by the time-limited zones 1104 and 1106 of the main engine. More particularly, the lower boundary of the time-limited zone 1104 of the main engine is the same, or approximately the same, as the lower boundary of the time-limited zone 1108. In like manner, the upper boundary of the time-limited zone 1106 of the main engine is the same, or approximately the same, as the upper boundary of the time-limited zone 1108. Thus, the main engine enters and exits the time-limited zone 1104 at the same lower-boundary collective position at which the supplemental engine enters and exits the time-limited zone 1108 (or at approximately the same lower-boundary collective position). Since the time-limited zone 1108 spans a larger range of collective positions, the supplemental engine remains in the time-limited zone 1108 at the lower-boundary collective position at which the main engine enters and exits the time-limited zone 1106.

Although various commands have been described herein as being pilot-initiated, those having skill in the art that any of the commands can be initiated by the pilot or by an FCC or other avionics, either onboard or remote from the aircraft, without departing from principles disclosed herein. The terms "substantially," "approximately," "approximately," and "about" is defined as largely but not necessarily wholly what is specified (and includes what is specified; e.g., "substantially 90 degrees" includes 90 degrees and "substantially parallel" includes parallel), as understood by a person of ordinary skill in the art. The extent to which the description may vary will depend on how great a change can be instituted and still have a person of ordinary skill in the art recognized the modified feature as still having the required characteristics and capabilities of the unmodified feature. In general, but subject to the preceding, a numerical value herein that is modified by a word of approximation such as "substantially," "approximately," and "about" may vary from the stated value, for example, by 0.1, 0.5, 1, 2, 3, 4, 5, 10, or 15 percent.

The foregoing outlines features of several embodiments so that those skilled in the art may better understand the aspects of the disclosure. Those skilled in the art should appreciate that they may readily use the disclosure as a basis for designing or modifying other processes and structures for carrying out the same purposes and/or achieving the same advantages of the embodiments introduced herein. Those skilled in the art should also realize that such equivalent constructions do not depart from the spirit and scope of the disclosure and that they may make various changes, substitutions, and alterations without departing from the spirit and scope of the disclosure. The scope of the invention should be determined only by the language of the claims that follow. The term "comprising" within the claims is intended to mean "including at least" such that the recited listing of elements in a claim are an open group. The terms "a," "an" and other singular terms are intended to include the plural forms thereof unless specifically excluded.

What is claimed is:

1. An aircraft comprising: a drive system; a main engine coupled to the drive system to provide first power; a supplemental engine coupled to the drive system to provide second power additive to the first power; and a control system to control the main engine and the supplemental engine to optimize usage of the supplemental engine, wherein the control system is operable to: maintain the supplemental engine in a reduced power state at least until a determination is made that supplemental power is needed to satisfy a total power demand of the drive system, wherein the maintaining of the supplemental engine in the reduced power state comprises keeping the supplemental engine in the reduced power state at least while the aircraft is in a particular flight segment associated with low power demand, the particular flight segment associated with the low power demand is automatically detected when an airspeed of the aircraft is between a first predetermined airspeed and a second predetermined airspeed; determine that supplemental power is needed to satisfy the total power demand of the drive system; and increase a power level of the supplemental engine in response to the determination that supplemental power is needed.

2. The aircraft of claim 1, wherein the determination that supplemental power is needed comprises detection that the aircraft is no longer in the particular flight segment associated with low power demand.

3. The aircraft of claim 2, wherein the particular flight segment is cruise.

4. The aircraft of claim 1, wherein the control system is operable to:
determine that supplemental power is no longer needed to satisfy the total power demand of the drive system; and
maintain the supplemental engine in the reduced power state in response to the determination that supplemental power is no longer needed.

5. The aircraft of claim 1, wherein the determination that supplemental power is needed comprises receipt of a pilot command.

6. The aircraft of claim 1, wherein the reduced power state corresponds to an idle state of the supplemental engine.

7. The aircraft of claim 1, wherein the reduced power state corresponds to an off state of the supplemental engine.

8. The aircraft of claim 1, wherein the increased power level comprises a maximum continuous power of the supplemental engine.

9. A computer system comprising a processor and a memory, wherein the processor and the memory in combination are operable to implement a method comprising:
operating an aircraft comprising a multi-engine drive system, a main engine applying a first power to the multi-engine drive system, and a supplemental engine applying a second power to the multi-engine drive system;
maintaining the supplemental engine in a reduced power state at least until a determination is made that supplemental power is needed to satisfy a total power demand of the multi-engine drive system, wherein the reduced power state corresponds to a lowest power setting of the supplemental engine;
determining that supplemental power is needed to satisfy the total power demand of the multi-engine drive system; and
increasing a power level of the supplemental engine in response to the determining.

10. The computer system of claim 9, the method comprising
monitoring the total power demand for the multi-engine drive system; and
wherein the maintaining the supplemental engine in the reduced power state comprises keeping the supplemental engine in the reduced power state until the total power demand is at least a specified proportion of a rated power of the main engine.

11. The computer system of claim 10, wherein the rated power of the main engine comprises a maximum continuous power of the main engine.

12. The computer system of claim 10, wherein, responsive to a determination that the total power demand is at least the specified proportion of the rated power, the increasing the power level of the supplemental engine comprises increasing the power level of the supplemental engine to a rated power of the supplemental engine.

13. The computer system of claim 12, wherein the rated power of the supplemental engine comprises a maximum continuous power.

14. The computer system of claim 10, wherein, responsive to a determination that the total power demand is at least a second specified proportion of the rated power of the main engine, the increasing the power level of the supplemental engine comprises increasing the power level of the supplemental engine to an intermediate rated power of the supplemental engine.

15. The computer system of claim 9, the method comprising:
monitoring airspeed; and
wherein the maintaining the supplemental engine in the reduced power state comprises keeping the supplemental engine in the reduced power state until the airspeed is at least an airspeed threshold.

16. The computer system of claim 9, the method comprising:
monitoring the total power demand for the multi-engine drive system and airspeed; and
wherein the maintaining the supplemental engine in the reduced power state comprises keeping the supplemental engine in the reduced power state until at least one of the following occurs:
the total power demand is at least a specified proportion of a rated power of the main engine; and
the airspeed is at least an airspeed threshold.

17. A method comprising: operating an aircraft comprising a multi-engine drive system, a main engine applying a first power to the multi-engine drive system, and a supplemental engine applying a second power to the multi-engine drive system; maintaining the supplemental engine in a reduced power state at least until a determination is made that supplemental power is needed to satisfy a total power demand of the multi-engine drive system, wherein the maintaining of the supplemental engine in the reduced power state comprises keeping the supplemental engine in the reduced power state at least while the aircraft is in a particular flight segment associated with low power demand, the particular flight segment associated with the low power demand is automatically detected when an airspeed of the aircraft is between a first predetermined airspeed and a second predetermined airspeed; determining that supplemental power is needed to satisfy the total power demand of the multi-engine drive system; and increasing a power level of the supplemental engine in response to the determining.

18. The method of claim 17, comprising displaying a time-limited zone of the main engine and a time-limited zone of the supplemental engine in relation to collective position.

* * * * *